US012658533B2

(12) United States Patent
Chen

(10) Patent No.: US 12,658,533 B2
(45) Date of Patent: Jun. 16, 2026

(54) SECONDARY BATTERY, APPARATUS AND MANUFACTURING METHOD FOR SECONDARY BATTERY

(71) Applicant: CONTEMPORARY AMPEREX TECHNOLOGY (HONG KONG) LIMITED, Hong Kong (CN)

(72) Inventor: Lei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1152 days.

(21) Appl. No.: 17/138,519

(22) Filed: Dec. 30, 2020

(65) Prior Publication Data

US 2021/0135321 A1 May 6, 2021

Related U.S. Application Data

(63) Continuation of application No. PCT/CN2020/086838, filed on Apr. 24, 2020.

(30) Foreign Application Priority Data

Jun. 11, 2019 (CN) .......................... 201920872176.4

(51) Int. Cl.
*H01M 50/536* (2021.01)
*H01M 10/04* (2006.01)
(52) U.S. Cl.
CPC ......... *H01M 50/536* (2021.01); *H01M 10/04* (2013.01)
(58) Field of Classification Search
CPC ............... H01M 50/536; H01M 10/04; H01M 10/0525; H01M 10/0585; H01M 50/54;
(Continued)

(56) References Cited

U.S. PATENT DOCUMENTS

2015/0056506 A1* 2/2015 Lilley ................... H01M 4/134
429/211
2017/0040635 A1* 2/2017 Choi ................... B23K 35/0255
2018/0040918 A1* 2/2018 Guen ................... H01M 50/581

FOREIGN PATENT DOCUMENTS

CN 105406106 A 3/2016
CN 207818629 U 9/2018
(Continued)

OTHER PUBLICATIONS

Extended European Search Report dated Mar. 14, 2022 received in European Patent Application No. EP 20823076.3.

*Primary Examiner* — Ula C Ruddock
*Assistant Examiner* — Sarika Gupta
(74) *Attorney, Agent, or Firm* — Scully, Scott, Murphy & Presser, P.C.

(57) ABSTRACT

The present application provides a secondary battery, an apparatus and a manufacturing method for a secondary battery. The electrode assembly is housed in the packaging bag, and the electrode assembly includes a main body portion and a first electrode tab extending from the main body portion. The first electrode tab is set in multiple layers, and the multiple layers of the first electrode tab are connected by ultrasonic welding to form a first welding region. The electrode lead is connected to the electrode assembly and extends to an outside of the packaging bag, and the electrode lead is connected to the multiple layers of the first electrode tab by laser welding to form a second welding region. In a plane perpendicular to a thickness direction of the electrode lead, a projection of the second welding region is located in a projection of the first welding region.

14 Claims, 6 Drawing Sheets

(58) Field of Classification Search
CPC ..... H01M 50/55; H01M 50/105; Y02P 70/50;
Y02E 60/10
See application file for complete search history.

(56)                   References Cited

FOREIGN PATENT DOCUMENTS

| CN | 208400930 | U | 1/2019 |
| CN | 209786103 | U | 12/2019 |
| KR | 20170095067 | A | 8/2017 |

* cited by examiner

SECONDARY BATTERY, APPARATUS AND MANUFACTURING METHOD FOR SECONDARY BATTERY

CROSS-REFERENCE TO RELATED APPLICATIONS

This application is a continuation of International Application No. PCT/CN2020/086838, filed on Apr. 24, 2020, which claims priority to Chinese Patent Application No. 201920872176.4, filed on Jun. 11, 2019. Both of the afore-mentioned applications are hereby incorporated by reference in their entireties.

TECHNICAL FIELD

The present application relates to the field of batteries, and in particular, to a secondary battery, an apparatus and a manufacturing method for a secondary battery.

BACKGROUND

With the rapid development of portable electronic devices, requirements for battery energy density are getting higher and higher. In a secondary battery, a packaging bag made of an aluminum plastic film or a steel plastic film may be used to replace a metal housing to reduce weight of the battery and increase energy density. An electrode assembly of the secondary battery is housed in the packaging bag, and edges of the packaging bag may be connected in a sealing manner by thermal compression. Certainly, to achieve charging and discharging of the electrode assembly, the secondary battery further includes an electrode lead, and the electrode lead is connected to the electrode assembly and extends to an outside of the packaging bag. In the prior art, an electrode lead is connected to an electrode tab of an electrode assembly by ultrasonic welding. However, in a process of ultrasonic welding, a welding device needs to be tightly pressed against the electrode lead, which easily results in that the electrode lead bends and deforms. The deformed electrode lead easily punctures a packaging bag, which affects sealing performance.

SUMMARY

In view of the problems in the background, an objective of the present application is to provide a secondary battery, an apparatus and a manufacturing method for a secondary battery, and the secondary battery can reduce a risk of deformation of an electrode lead and improve sealing performance.

To achieve the foregoing objective, the present application provides a secondary battery including an electrode assembly, a packaging bag and an electrode lead. The electrode assembly is housed in the packaging bag, and the electrode assembly includes a main body portion and a first electrode tab extending from the main body portion; the first electrode tab is set in multiple layers, and the multiple layers of the first electrode tab are connected by ultrasonic welding to form a first welding region; the electrode lead is con-nected to the electrode assembly and extends to an outside of the packaging bag, and the electrode lead is connected to the multiple layers of the first electrode tab by laser welding to form a second welding region; and in a plane perpen-dicular to a thickness direction of the electrode lead, a projection of the second welding region is located in a projection of the first welding region.

According to the secondary battery as described above, the first welding region has a plurality of first recesses, and the plurality of first recesses are disposed at intervals. In the plane perpendicular to the thickness direction of the elec-trode lead, a ratio of a sum of areas of projections of the plurality of first recesses to an area of the projection of the first welding region is greater than 50%.

According to the secondary battery as described above, in a direction parallel to the electrode lead, a size of each first recess is larger than a minimum distance of spacing between two adjacent first recesses.

According to the secondary battery as described above, the second welding region has a plurality of second recesses, and the plurality of second recesses are disposed at intervals. In the plane perpendicular to the thickness direction of the electrode lead, a projection of at least one second recess at least partially overlaps a projection of the first recesses.

According to the secondary battery as described above, a ratio of an area of the second welding region to an area of the first welding region is 0.3-0.7.

According to the secondary battery as described above, each layer of the first electrode tab includes a connecting portion and a collecting portion, the collecting portion extends in a direction parallel to the electrode lead, and the connecting portion connects the main body portion and the collecting portion; and in the thickness direction of the electrode lead, connecting portions of the multiple layers of the first electrode tab converge toward a middle region of the main body portion. Collecting portions of the multiple layers of the first electrode tab are connected by the ultrasonic welding to form the first welding region.

According to the secondary battery as described above, the secondary battery further includes an insulating member, the insulating member surrounds an outer side of the elec-trode lead and isolates the electrode lead from the packaging bag. The insulating member includes an encapsulating por-tion and an inner extending portion, the encapsulating por-tion is fused to the packaging bag, and the inner extending portion extends from an end part of the encapsulating portion close to the main body portion toward an inside of the packaging bag.

According to the secondary battery as described above, in a direction parallel to the electrode assembly, a minimum distance between the inner extending portion and the second welding region is greater than 0.5 mm.

According to the secondary battery as described above, a thickness of the electrode lead is 0.6 mm-3 mm.

According to the secondary battery as described above, the packaging bag includes two packaging films, the elec-trode assembly is located between the two packaging films, and the two packaging films are connected at edges to form a sealing portion. Each packaging film includes a protective layer, a metal layer and a connecting layer, the connecting layer is disposed on a surface of the metal layer facing the electrode assembly, and the protective layer is disposed on a surface of the metal layer away from the electrode assem-bly. The electrode lead passes between the two packaging films.

The present application further provides an apparatus including the secondary battery as described above.

The present application further provides a manufacturing method for a secondary batter including: producing an electrode assembly, the electrode assembly including a main body portion and a first electrode tab and a second electrode tab extending from the main body portion, and the first electrode tab and the second electrode tab being both set in multiple layers;

connecting the multiple layers of the first electrode tab by ultrasonic welding to form a first welding region;

providing an electrode lead, the electrode lead being connected to the electrode assembly and extending to an outside of a packaging bag; and connecting the electrode lead to the multiple layers of the first electrode tab by laser welding to form a second welding region, in a plane perpendicular to a thickness direction of the electrode lead, a projection of the second welding region being located in a projection of the first welding region.

According to the manufacturing method of the secondary battery as described above, the step of connecting the multiple layers of the first electrode tab by the ultrasonic welding to form the first welding region is completed before the step of connecting the electrode lead to the multiple layers of the first electrode tab by the laser welding.

The beneficial effects of the present application are as follows: in the present application, an electrode lead and a first electrode tab are connected by means of laser welding without application of pressure to the electrode lead, thereby reducing a risk of bending and deforming the electrode lead, avoiding puncturing a package bag, and improving sealing performance. In addition, before the laser welding is performed, multiple layers of the first electrode tab have been welded together in advance to form a first welding region with a certain thickness, there is no gap in the first welding region, and then connection strength between the electrode lead and the first electrode tab is ensured. Meanwhile, a region where the electrode lead is melted is completely covered by the first welding region. Therefore, according to the present application, high temperature fusion of the first electrode tab with a small thickness can be avoided, and a current flow capacity of an electrode assembly is ensured.

Reference signs are explained as follows:

1: electrode assembly; 11: main body portion; 12: first electrode tab; 121: first welding region; 121a: first recess; 122: connecting portion; 123: collecting portion; 13: second electrode tab; 14: first electrode sheet; 15: second electrode sheet: 16: diaphragm; 2: packaging bag; 21: sealing portion; 22: packaging film; 221: protective layer; 222: metal layer; 223: connecting layer; 3: electrode lead; 31: second welding region; 32: second recess; 4: insulating member; 41: encapsulating portion; 42: inner extending portion; X: length direction; Y: width direction; and Z: thickness direction.

DESCRIPTION OF EMBODIMENTS

To make the objectives, technical solutions, and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first" and "second" are merely intended for a purpose of description, and shall not be understood as an indication or implication of relative importance. The term "a plurality of" refers to more than two (including two). Unless otherwise specified or illustrated, the term "connection" should be understood broadly, for example, the "connection" may either be a fixed connection, or a detachable connection, or an integrated connection, or an electrical connection, or a signal connection; and the "connection" may either be a direct connection, or an indirect connection through an intermediary. Those of ordinary skill in the art may appreciate the specific meanings of the foregoing terms in the present application according to specific conditions.

In the description of the specification, it should be understood that the terms representing directions such as "up" and "down" described in the embodiments of the present application are described from the angles shown in the accompanying drawings, and should not be understood as limitation on the embodiments of the present application. The present application will be further described below in detail through the specific embodiments with reference to the accompanying drawings.

Figure 1:
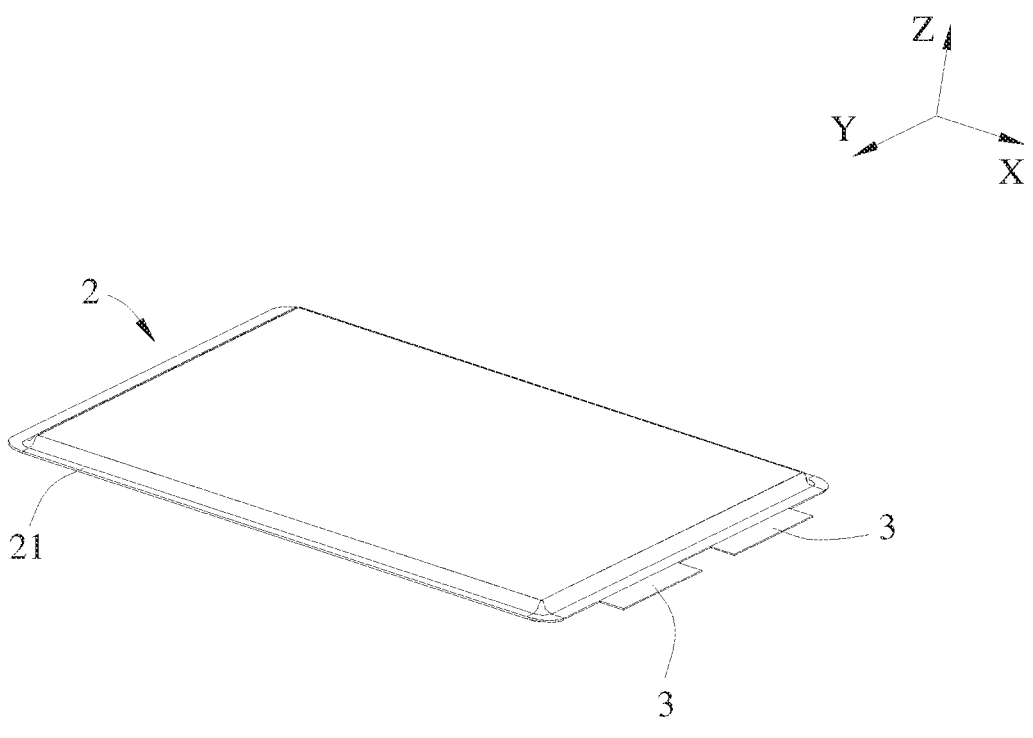
FIG. 1 is a schematic diagram of a secondary battery according to the present application.
Figure 2:
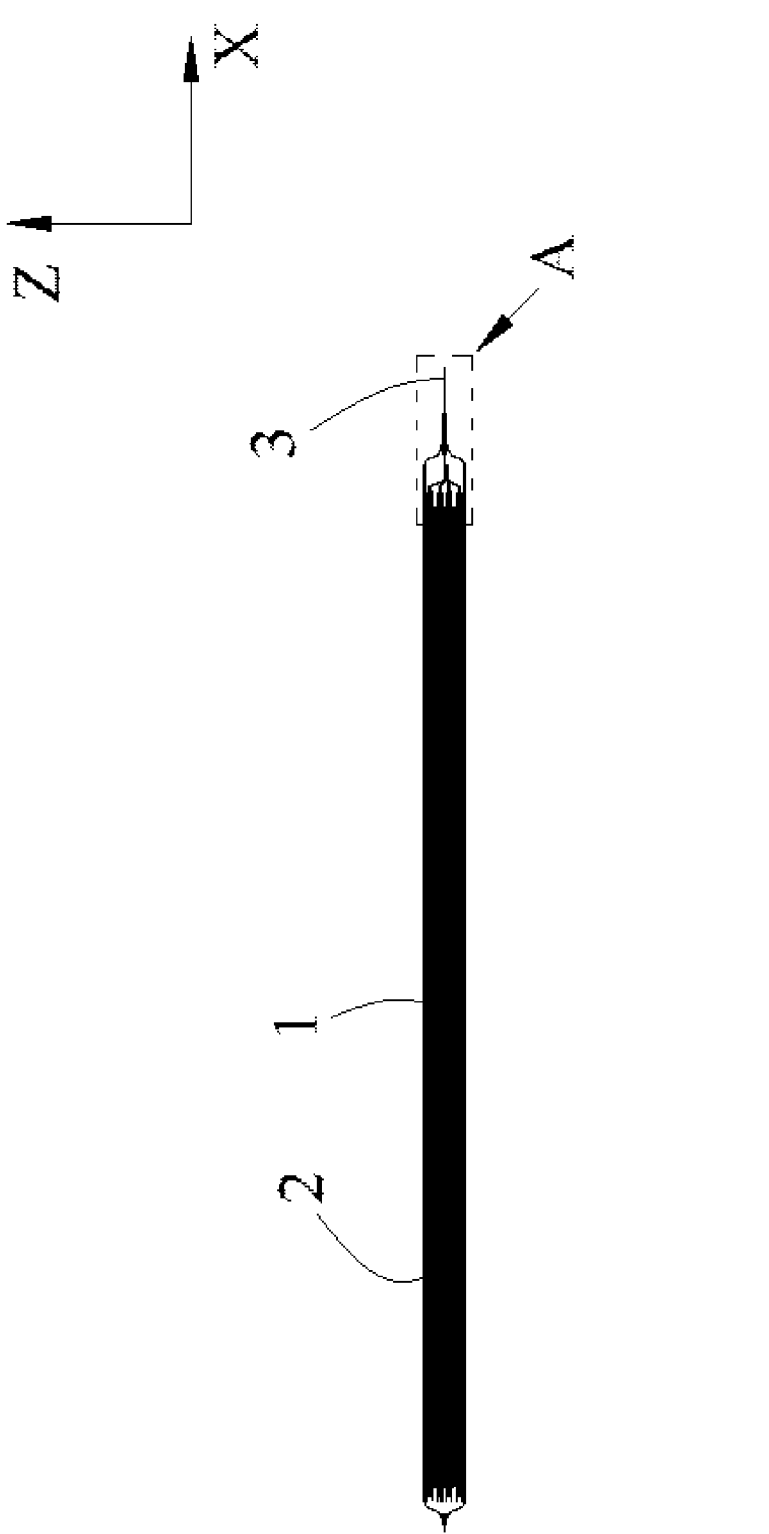
FIG. 2 is a sectional view of the secondary battery of FIG. 1.
Figure 3:
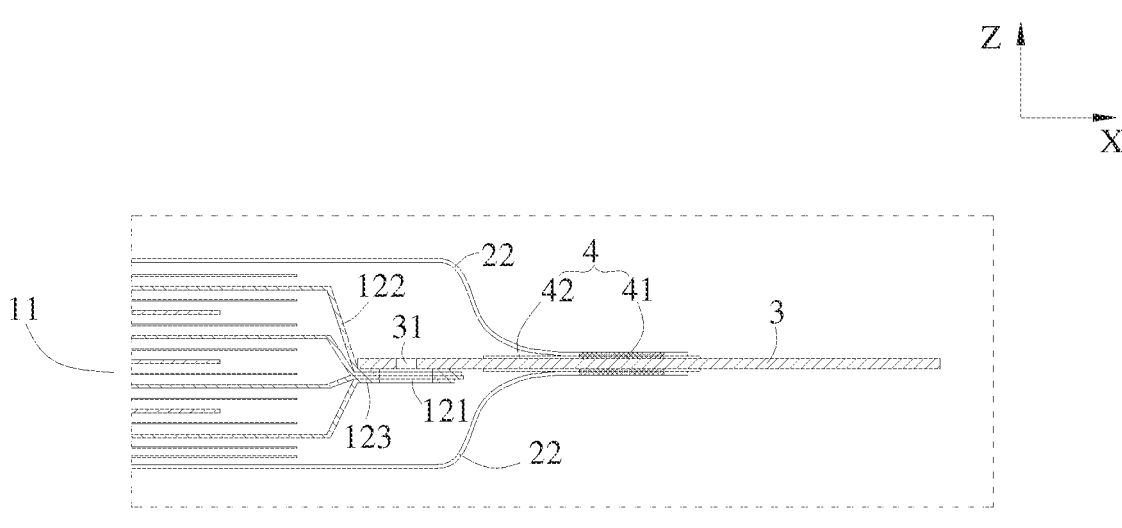
FIG. 3 is an enlarged view of the secondary battery of FIG. 2 in a block A.

With reference to FIG. 1, FIG. 2 and FIG. 3, a secondary battery of the present application includes an electrode assembly 1, a packaging bag 2, an electrode lead 3 and an insulating member 4.

The electrode assembly 1 is a core member of the secondary battery for achieving charging and discharging functions. The electrode assembly 1 includes a first electrode sheet 14, a second electrode sheet 15 and a diaphragm 16, and the diaphragm 16 isolates the first electrode sheet 14 from the second electrode sheet 15.

Figure 7:
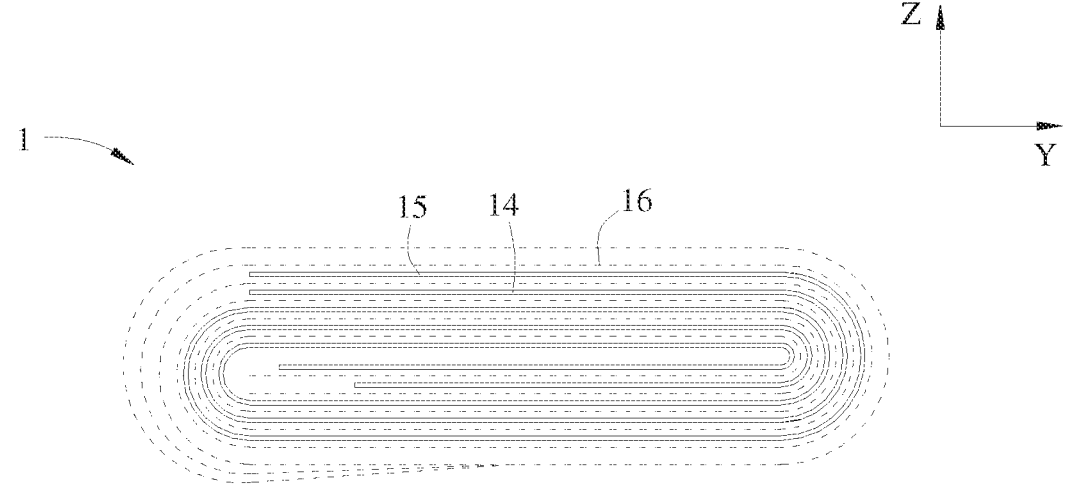
FIG. 7 is a sectional view of the electrode assembly of FIG. 6 taken along a line B-B.

In the present application, the electrode assembly 1 may be in a winding structure. With reference to FIG. 7, the first electrode sheet 14, the second electrode sheet 15 and the diaphragm 16 are all in banded structures. The first electrode sheet 14, the diaphragm 16 and the second electrode sheet 15 are stacked in sequence and wound more than two turns to form the electrode assembly 1, and the electrode assembly 1 is in a flat shape. When the electrode assembly 1 is produced, the electrode assembly 1 may be wound into a hollow cylindrical structure first, and then flattened into a flat shape after the winding.

Alternatively, the electrode assembly 1 may also be in a laminated structure. Specifically, the electrode assembly 1 includes a plurality of first electrode sheets 14 and a plurality of second electrode sheets 15, the plurality of first electrode sheets 14 and the plurality of second electrode sheets 15 are stacked alternatively in a thickness direction Z, and a diaphragm 16 is disposed between the first electrode sheet 14 and the second electrode sheet 15.

The first electrode sheet 14 includes a first current collector and a first active material layer coated on a surface of the first current collector, and only a partial region of the first current collector is coated with the first active material layer. Specifically, a region of the first current collector coated with the first active material layer and the first active material layer form a first coating region of the first electrode sheet 14, and a region of the first current collector not coated with the first active material layer forms a first blank region of the first electrode sheet 14. The first blank region may be in plurality.

Similarly, the second electrode sheet 15 includes a second current collector and a second active material layer coated on a surface of the second current collector, and only a partial region of the second current collector is coated with the second active material layer. Specifically, a region of the second current collector coated with the second active material layer and the second active material layer form a second coating region of the second electrode sheet 15, and a region of the second current collector not coated with the second active material layer forms a second blank region of the second electrode sheet 15. The second blank region may be in plurality.

One of the first electrode sheet 14 and the second electrode sheet 15 is a positive electrode sheet, and the other of the first electrode sheet 14 and the second electrode sheet 15 is a negative electrode sheet. A current collector of the positive electrode sheet may be aluminum foil, and an active material layer of the positive electrode sheet includes a ternary material, lithium manganate or lithium iron phosphate. A current collector of the negative electrode sheet may be copper foil, and an active material layer of the negative electrode sheet includes graphite or silicon.

From the appearance of the electrode assembly 1, the electrode assembly 1 of the present application includes a main body portion 11, a first electrode tab 12 and a second electrode tab 13, the first electrode tab 12 and the second electrode tab 13 may extend from the same end of the main body portion 11 in a length direction X, or respectively extend from two ends of the main body portion 11 in the length direction X. The main body portion 11 includes the first coating region, the diaphragm 16 and the second coating region, the first electrode tab 12 is the first blank region of the first electrode sheet 14, and the second electrode tab 13 is the second blank region of the second electrode sheet 15. To improve a current flow capacity, the first electrode tab 12 is set in multiple layers that are stacked together, and the second electrode tab 13 is set in multiple layers that are stacked together.

To avoid a short circuit, the diaphragm 16 needs to isolate the first coating region from the second coating region completely. Therefore, in the length direction X, two ends of the diaphragm 16 are both beyond the first coating region and the second coating region. The diaphragm 16 is wound into multiple layers, the two ends of the diaphragm 16 in the length direction X approximately form two end faces.

Figure 4:
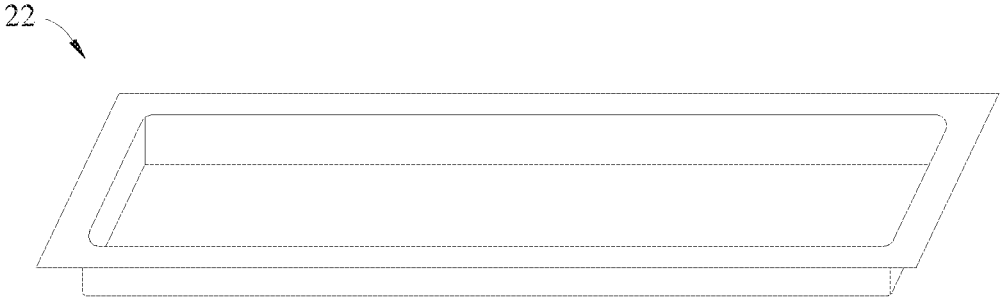
FIG. 4 is a schematic diagram of a packaging film of a packaging bag of a secondary battery according to the present application.

The packaging bag 2 includes two packaging films 22, and the two packaging films 22 are arranged up and down in the thickness direction Z. With reference to FIG. 4, at least one packaging film 22 is stamped to form a concave chamber, and the electrode assembly 1 is located between the two packaging films 22 and housed in the concave chamber.

Figure 5:
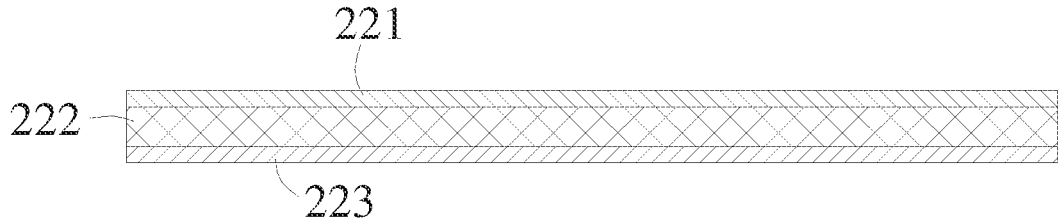
FIG. 5 is a sectional view of the packaging film of FIG. 4.

With reference to FIG. 5, each packaging film 22 includes a protective layer 221, a metal layer 222 and a connecting layer 223, and the protective layer 221 and the connecting layer 223 are respectively disposed on two sides of the metal layer 222. Specifically, the protective layer 221 may be fixed to a surface of the metal layer 222 away from the electrode assembly 1 through a binder, and the connecting layer 223 may be fixed to a surface of the metal layer 222 close to the electrode assembly 1 through the binder.

A material of the protective layer 221 may be nylon or polyethylene glycol terephthalate, a material of the metal layer 222 may be aluminum foil or steel foil, and a material of the connecting layer 223 may be polypropylene.

The two packaging films 22 are connected at edges to form a sealing portion 21. Specifically, by thermal compression, connecting layers 223 of the two packaging films 22 are directly or indirectly connected together, thereby forming a sealed packaging bag 2.

The electrode lead 3 is connected to the electrode assembly 1, passes through the sealing portion 21 and extends to an outside of the packaging bag 2. Specifically, there may be two electrode leads 3, one electrode lead 3 is connected to the first electrode tab 12, and the other electrode lead 3 is connected to the second electrode tab 13. The two electrode leads 3 connect the electrode assembly 1 and other members outside the packaging bag 2, and then charging and discharging of the electrode assembly 1 are achieved. A material of the electrode lead 3 may be aluminum, nickel or copper plated with nickel.

There may be two insulating members 4. The two insulating members 4 respectively isolate the two electrode leads 3 from the sealing portion 21. Each insulating member 4 surrounds an outer side of a corresponding electrode lead 3. A part of the insulating member 4 is clamped between the two packaging films 22, thereby isolating the electrode lead 3 from the packaging films 22 and reducing a risk of contact of the electrode lead 3 with the metal layer 222. A material of the insulating member 4 may be polypropylene.

A secondary battery of the present application may be molded according to the following steps.

(i) A first electrode sheet 14, a diaphragm 16 and a second electrode sheet 15 are stacked together, wound multiple turns, and then flattened into a flat shape after the winding to produce an electrode assembly 1. After the molding by winding, multiple layers of a first electrode tab 12 are stacked in a thickness direction Z, and multiple layers of a second electrode tab 13 are stacked in the thickness direction Z.

Figure 6:
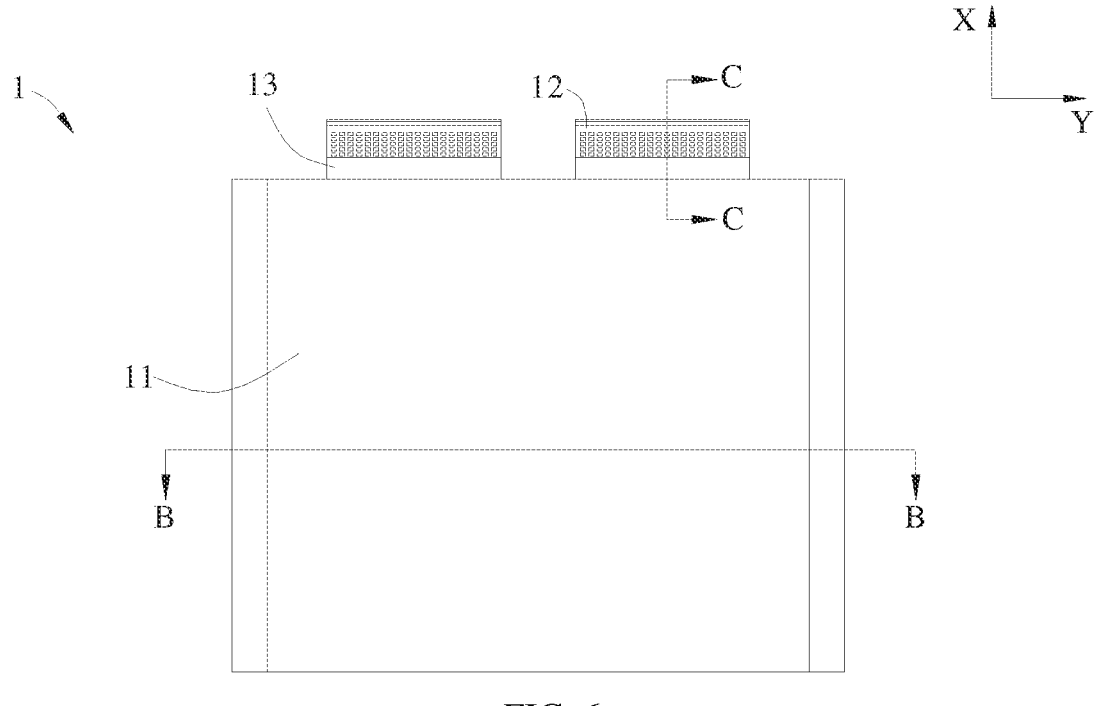
FIG. 6 is a schematic diagram of an electrode assembly of a secondary battery according to the present application.
Figure 8:
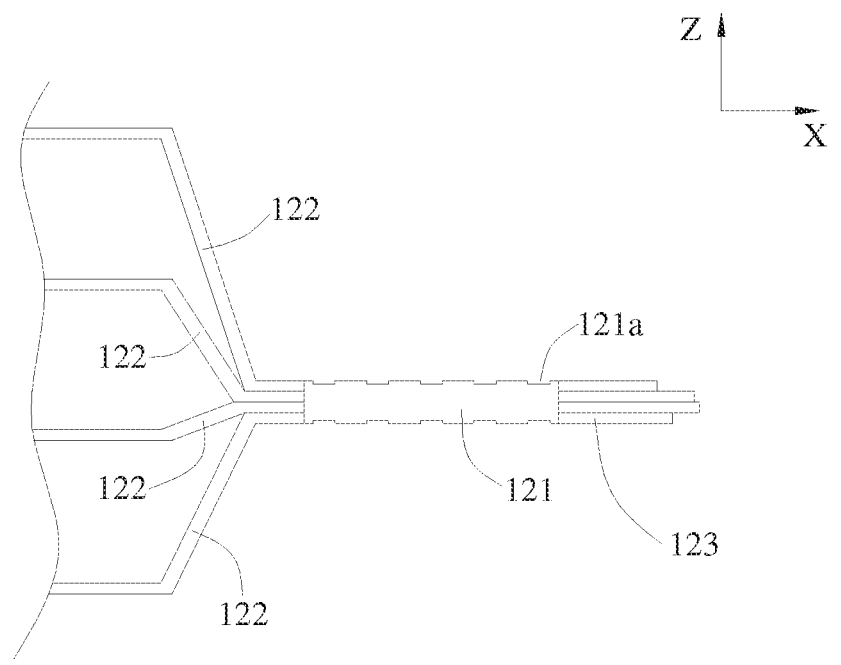
FIG. 8 is a sectional view of the electrode assembly of FIG. 6 taken along a line C-C.

(ii) With reference to FIG. 6 and FIG. 8, by ultrasonic welding, multiple layers of the first electrode tab 12 of the electrode assembly 1 are connected together to form a first welding region 121. Similarly, by the ultrasonic welding, multiple layers of the second electrode tab 13 of the electrode assembly 1 are connected together.

Figure 9:
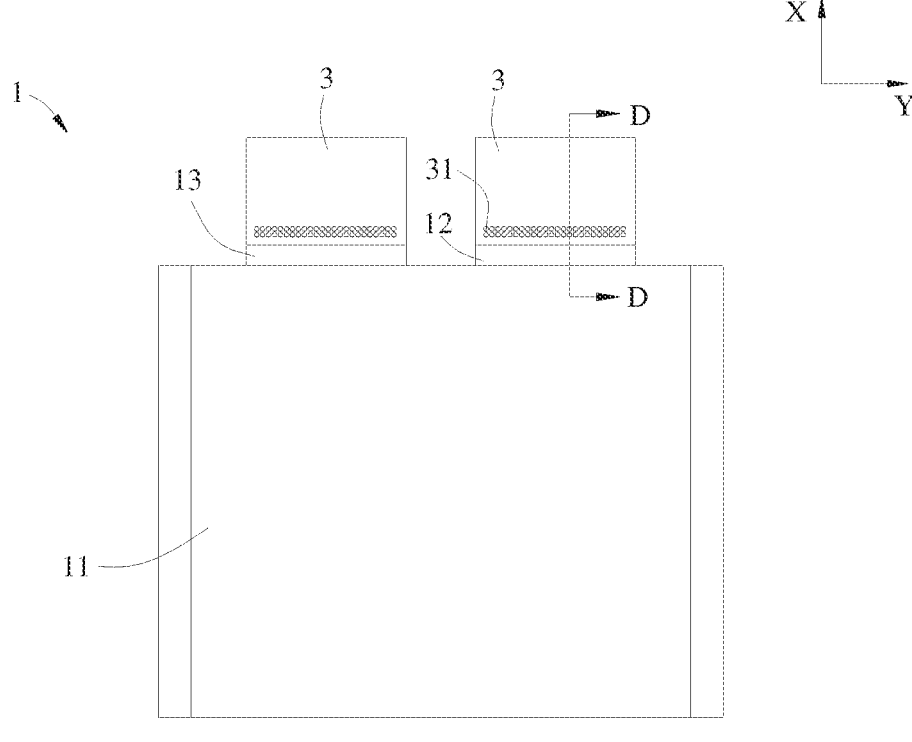
FIG. 9 is a schematic diagram of an electrode assembly and an electrode lead of a secondary battery according to the present application.
Figure 10:
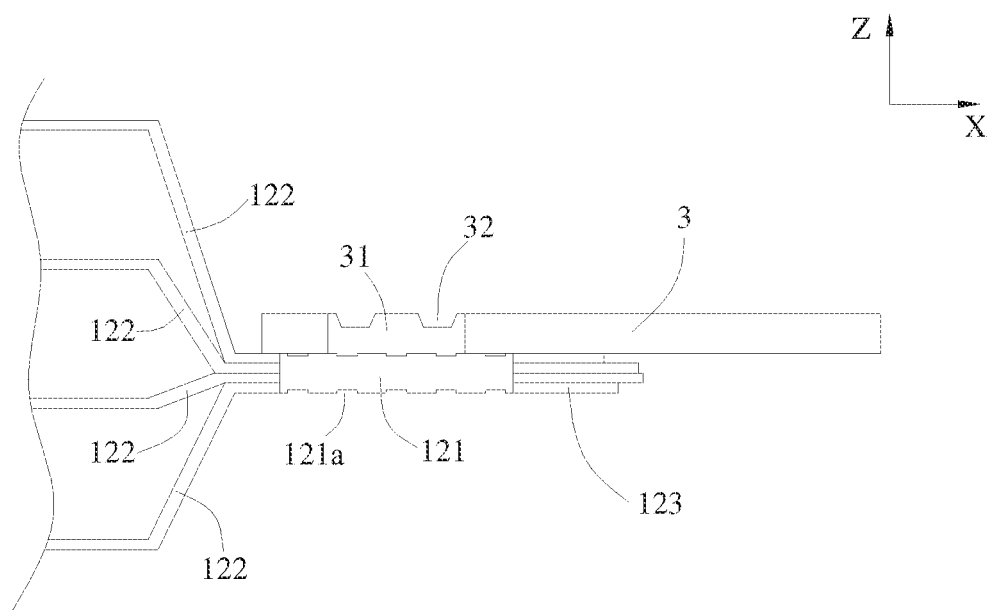
FIG. 10 is a sectional view of FIG. 9 taken along a line D-D.

(iii) With reference to FIG. 9 and FIG. 10, the first electrode tab 12 and one electrode lead 3 are stacked up and down, and by laser welding, the electrode lead 3 and the first welding region 121 are connected together. Similarly, by the laser welding, the other electrode lead 3 and the second electrode tab 13 are connected together. The electrode lead 3 and an insulating member 4 have been bonded together in advance.

(iv) The electrode assembly 1 is placed in a concave chamber of one packaging film 22, and the other packaging film 22 covers the one packaging film 22 from above.

(v) Edge regions of the two packaging films 22 are thermally compressed using an encapsulating device to form a sealing portion 21.

(vi) An electrolyte is injected into a package bag 2, and then a secondary battery is obtained through processes of standing, chemical conversion, shaping and the like.

In step (ii), the multiple layers of the first electrode tab 12 may be pressed tightly between a welding head and a welding seat of an ultrasonic welding device, the welding head and the welding seat transmit high frequency vibration waves to the first electrode tab 12, so that the multiple layers of the first electrode tab 12 rub against each other and are fused together. Before the ultrasonic welding, a surface of the first electrode tab 12 is flat, which does not damage the welding head and the welding seat.

In step (iii), a laser may be applied to a surface of the electrode lead 3 away from the first electrode tab 12. Under the action of the laser, a partial region of the electrode lead 3 is melted to form a second welding region 31. Meanwhile, under the action of high temperature, a partial region of the first welding region 121 is melted and connected to the second welding region 31.

After the second welding region 31 solidifies, the second welding region 31 is directly connected to the first welding region 121 as a whole. In a plane perpendicular to the thickness direction Z of the electrode lead 3, a projection of the second welding region 31 is located in a projection of the first welding region 121. When the laser welding is performed, a region where the electrode lead 3 is melted is completely covered by the first welding region 121.

In step (iii), if the ultrasonic welding device is used to connect the electrode lead 3 and the first welding region 121, the welding head and the welding seat need to apply pressure to the electrode lead 3, which results in that the electrode lead 3 bends and deforms. The deformed electrode lead 3 easily punctures the packaging bag 2, which affects sealing performance. Meanwhile, high frequency vibration in the welding process will affect connection strength between the electrode lead 3 and the insulating member 4, cause a risk of separation of the insulating member 4 from the electrode lead 3 and affect the sealing performance.

In addition, if the multiple layers of the first electrode tab 12 are not welded in advance through step (ii), there must be gaps among the multiple layers of the first electrode tab 12. That is, if step (ii) is omitted and the laser welding is directly used to connect the electrode lead 3 and the first electrode tab 12, the gaps among the multiple layers of the first electrode tab 12 will result in poor welding and reduce connection strength and a current flow area between the electrode lead 3 and the first electrode tab 12.

In the present application, an electrode lead 3 and a first electrode tab 12 are connected by means of laser welding without application of pressure to the electrode lead 3, thereby reducing a risk of bending and deforming the electrode lead 3, avoiding puncturing a package bag 2, and improving sealing performance. In addition, before the laser welding is performed, multiple layers of the first electrode tab 12 have been welded together in advance to form a first welding region 121 with a certain thickness, there is no gap in the first welding region 121, and then connection strength between the electrode lead 3 and the first electrode tab 12 is ensured. Meanwhile, a region where the electrode lead 3 is melted is completely covered by the first welding region 121. Therefore, according to the present application, high temperature fusion of the first electrode tab 12 with a small thickness can be avoided, and a current flow capacity of an electrode assembly 1 is ensured.

In addition, in laser welding, a laser is directly applied to the electrode lead 3, which can also protect the first electrode tab 12 and avoid fusing the first electrode tab 12 with the small thickness.

In step (ii), to achieve the ultrasonic welding, the welding head and the welding seat are both provided with tooth-shaped structures. The tooth-shaped structures squeeze the first electrode tab 12 so that the first electrode tab 12 is melted around the tooth-shaped structures, and then the multiple layers of the first electrode tab 12 are fused into one body. Correspondingly, after the welding is completed, with reference to FIG. 6 and FIG. 8, a plurality of first recesses 121a are left on the formed first welding region 121, and the plurality of first recesses 121a are disposed at intervals. The shapes, positions and number of the first recesses 121a correspond to those of the tooth-shaped structures on the welding head and the welding seat.

In the plane perpendicular to the thickness direction Z of the electrode lead 3, a ratio of a sum of areas of projections of the plurality of first recesses 121a to an area of the projection of the first welding region 121 is greater than 50%. The greater the ratio is, and the higher connection strength among and current flow capacities of the multiple layers of the first electrode tab 12 are. Therefore, optionally, the ratio is greater than 50%.

In a direction parallel to the electrode lead 3, a size of each first recess 121a is larger than a minimum distance between two adjacent first recesses 121a. The direction parallel to the electrode lead 3 is a direction perpendicular to the thickness direction Z of the electrode lead 3. The direction parallel to the electrode lead 3 may either be a length direction X or a width direction Y. For example, when two first recesses 121a are arranged in the length direction X, sizes of the two first recesses 121a in the length direction X are both larger than a minimum distance between the two first recesses 121a in the length direction X. When two first recesses 121a are arranged in the width direction Y, sizes of the two first recesses 121a in the width direction Y are both larger than a minimum distance between the two first recesses 121a in the width direction Y In ultrasonic welding, the multiple layers of the first electrode tab 12 are melted around the first recess 121a. The larger the size of the first recess 121a is, and the larger a melting range in welding is. If spacing between two first recesses 121a is too large, it is easy to result in that a partial region located between the two first recesses 121a is melted difficultly, and thus poor welding is caused. Therefore, to ensure the connection strength of the multiple layers of the first electrode tab 12, in the direction parallel to the electrode lead 3, the size of each first recess 121a is larger than the minimum distance between two adjacent first recesses 121a.

In step (iii), the laser is applied to a surface of the electrode lead 3. Under the action of the laser, the electrode lead 3 is melted to generate a melten bath, and a second recess 32 is formed after the melten bath solidifies. To ensure welding strength, the laser may be applied to a plurality of positions of the electrode lead 3. Correspondingly, after the welding is completed, a plurality of second recesses 32 are left on the formed second welding region 31, and the plurality of second recesses 32 are disposed at intervals.

In step (iii), according to the present application, multi-point welding is performed on the electrode lead 3. Compared with conventional linear welding, the multi-point welding of the present application can reduce generation of metal particles and reduce a risk of puncturing the packaging film 22 by the metal particles.

In the plane perpendicular to the thickness direction Z of the electrode lead 3, a projection of at least one second recess 32 at least partially overlaps a projection of the first recesses 121*a*. In the process of laser welding, high temperature is transferred to the first welding region 121, so that a partial region of the first welding region 121 is melted. After the ultrasonic welding, strength of the first welding region 121 near the first recess 121*a* is higher. In step (iii), a position to which the laser is applied corresponds to a position of the second recess 32. When the second recess 32 partially overlaps the first recess 121*a* in the thickness direction Z, a risk of melting through the first welding region 121 can be reduced.

A ratio of an area of the second welding region 31 to an area of the first welding region 121 is 0.3-0.7. The area of the second welding region 31 is an area of a projection of the second welding region 31 in the plane perpendicular to the thickness direction Z, and the area of the first welding region 121 is the area of the projection of the first welding region 121 in the plane perpendicular to the thickness direction Z. If the ratio of the areas is less than 0.3, the current flow area between the electrode lead 3 and the first electrode tab 12 is small, and the connection strength is low. If the ratio of the areas is greater than 0.7, a range in which the laser is applied is larger, the high temperature generated easily damages the first electrode tab 12 and the insulating member 4, and more metal particles are generated, which affects safety performance of the secondary battery. Therefore, optionally, the ratio of the area of the second welding region 31 to the area of the first welding region 121 is 0.3-0.7.

With reference to FIG. 8 and FIG. 10, each layer of the first electrode tab 12 includes a connecting portion 122 and a collecting portion 123, the collecting portion 123 extends in a direction parallel to the electrode lead 3, and the connecting portion 122 connects the main body portion 11 and the collecting portion 123. Collecting portions 123 of the multiple layers of the first electrode tab 12 are connected by the ultrasonic welding to form the first welding region 121.

In the thickness direction Z of the electrode lead 3, connecting portions 122 of the multiple layers of the first electrode tab 12 converge toward a middle region of the main body portion 11. In step (i), the electrode assembly 1 is molded by winding, and the multiple layers of the first electrode tab 12 are stacked in the thickness direction Z. In this case, the multiple layers of the first electrode tab 12 may be converged to the middle first, and then step (ii) is performed. In the present application, by converging connecting portions 122 of the multiple layers of the first electrode tab 12 to the middle, dislocation of the first electrode tab 12 can be reduced, and a risk of occurrence of poor welding of the first electrode tab 12 in ultrasonic welding is reduced.

With reference to FIG. 3, the insulating member 4 includes an encapsulating portion 41 and an inner extending portion 42, the encapsulating portion 41 is fused to the packaging bag 2, and the inner extending portion 42 extends from an end part of the encapsulating portion 41 close to the main body portion 11 toward an inside of the packaging bag 2. Specifically, the encapsulating portion 41 may be fused to the connecting layer 222 of the packaging film 22 in step (v).

A material of the electrode lead 3 is metal, and a material of the insulating member 4 is polypropylene. Compared with connection strength between the encapsulating portion 41 and the sealing portion 21, connection strength between the electrode lead 3 and the encapsulating portion 41 is low. That is, when the electrode assembly 1 generates gas during the operation, the electrode lead 3 and the encapsulating portion 41 are more easily separated. Therefore, according to the present application, an inner extending portion 42 is preferably provided to increase a connection area between the electrode lead 3 and the insulating member 4, improve connection strength, and improve sealing performance.

In the process of laser welding, heat diffuses to the surroundings along the electrode lead 3. Since the insulating member 4 has been bonded to the electrode lead 3 in advance before the welding, if spacing between the insulating member 4 and the weld is too small, the heat in the welding process easily diffuses to the insulating member 4 and damages the insulating member 4, which affects the sealing performance of the secondary battery. Therefore, to reduce the influence of the heat on the insulating member 4, optionally, in a direction parallel to the electrode assembly 3, a minimum distance between the inner extending portion 42 and the second welding region 31 is greater than 0.5 mm.

A thickness of the electrode lead 3 is 0.6 mm-3 mm. If the thickness of the electrode lead 3 is less than 0.6 mm, it will result in an insufficient current flow capacity of the electrode lead 3. Meanwhile, in the process of laser welding, the electrode lead 3 and the first electrode tab 12 are easily melted through. If the thickness of the electrode lead 3 is greater than 3 mm, the electrode lead 3 will occupy larger space. Meanwhile, in step (v), a larger step will be formed at a position where the electrode lead 3 passes through the sealing portion 21, which affects sealing performance of the sealing portion 21.

An embodiment of the present application further provides an apparatus including the secondary battery described according to the foregoing embodiments. The apparatus may be a vehicle or an energy storage apparatus.

What is claimed is:

1. A secondary battery, comprising an electrode assembly, a packaging bag and an electrode lead;

wherein the electrode assembly is housed in the packaging bag, and the electrode assembly comprises a main body portion and a first electrode tab extending from the main body portion;

the first electrode tab is set in multiple layers, and the multiple layers of the first electrode tab are connected by ultrasonic welding to form a first welding region;

the electrode lead is connected to the electrode assembly and extends to an outside of the packaging bag, and the electrode lead is connected to the multiple layers of the first electrode tab by laser welding to form a second welding region, a laser is applied to a surface of the electrode lead away from the first electrode tab, and in the thickness direction of the electrode lead, the surface of the electrode lead that faces the multiple layers of the first electrode tab is welded when forming the second welding region;

in a plane perpendicular to a thickness direction of the electrode lead, a projection of the second welding region is located in a projection of the first welding region, and a ratio of an area of the projection of the second welding region to an area of the projection of the first welding region is 0.3-0.7;

the first welding region has a plurality of first recesses, and the plurality of first recesses are disposed at intervals;

in the plane perpendicular to the thickness direction of the electrode lead, a ratio of a sum of areas of projections of the plurality of first recesses to an area of the projection of the first welding region is greater than 50% and less than 100%;

the second welding region has a plurality of second recesses, and the plurality of second recesses are disposed at intervals; and in the plane perpendicular to the thickness direction of the electrode lead, a projection of at least one second recess at least partially overlaps a projection of the first recesses.

2. The secondary battery according to claim 1, wherein in a direction parallel to the electrode lead, a size of each first recess is larger than a minimum distance of spacing between two adjacent first recesses.

3. The secondary battery according to claim 1, wherein each layer of the first electrode tab comprises a connecting portion and a collecting portion, the collecting portion extends in a direction parallel to the electrode lead, and the connecting portion connects the main body portion and the collecting portion;

in the thickness direction of the electrode lead, connecting portions of the multiple layers of the first electrode tab converge toward a middle region of the main body portion; and collecting portions of the multiple layers of the first electrode tab are connected by the ultrasonic welding to form the first welding region.

4. The secondary battery according to claim 1, wherein a thickness of the electrode lead is 0.6 mm-3 mm.

5. The secondary battery according to claim 1, wherein the packaging bag comprises two packaging films, the electrode assembly is located between the two packaging films, and the two packaging films are connected at edges to form a sealing portion;

each packaging film comprises a protective layer, a metal layer and a connecting layer, the connecting layer is disposed on a surface of the metal layer facing the electrode assembly, and the protective layer is disposed on a surface of the metal layer away from the electrode assembly; and the electrode lead passes between the two packaging films.

6. An apparatus, wherein comprising a secondary battery, wherein the secondary battery comprising an electrode assembly, a packaging bag and an electrode lead;

wherein the electrode assembly is housed in the packaging bag, and the electrode assembly comprises a main body portion and a first electrode tab extending from the main body portion;

the first electrode tab is set in multiple layers, and the multiple layers of the first electrode tab are connected by ultrasonic welding to form a first welding region;

the electrode lead is connected to the electrode assembly and extends to an outside of the packaging bag, and the electrode lead is connected to the multiple layers of the first electrode tab by laser welding to form a second welding region, a laser is applied to a surface of the electrode lead away from the first electrode tab, and in the thickness direction of the electrode lead, the surface of the electrode lead that faces the multiple layers of the first electrode tab is welded when forming the second welding region;

in a plane perpendicular to a thickness direction of the electrode lead, a projection of the second welding region is located in a projection of the first welding region, and a ratio of an area of the projection of the second welding region to an area of the projection of the first welding region is 0.3-0.7;

the first welding region has a plurality of first recesses, and the plurality of first recesses are disposed at intervals;

in the plane perpendicular to the thickness direction of the electrode lead, a ratio of a sum of areas of projections of the plurality of first recesses to an area of the projection of the first welding region is greater than 50% and less than 100%;

the second welding region has a plurality of second recesses, and the plurality of second recesses are disposed at intervals; and in the plane perpendicular to the thickness direction of the electrode lead, a projection of at least one second recess at least partially overlaps a projection of the first recesses.

7. The apparatus according to claim 6, wherein in a direction parallel to the electrode lead, a size of each first recess is larger than a minimum distance of spacing between two adjacent first recesses.

8. The apparatus according to claim 6, wherein each layer of the first electrode tab comprises a connecting portion and a collecting portion, the collecting portion extends in a direction parallel to the electrode lead, and the connecting portion connects the main body portion and the collecting portion;

in the thickness direction of the electrode lead, connecting portions of the multiple layers of the first electrode tab converge toward a middle region of the main body portion; and collecting portions of the multiple layers of the first electrode tab are connected by the ultrasonic welding to form the first welding region.

9. A manufacturing method for a secondary battery, wherein comprising:

producing an electrode assembly, the electrode assembly comprising a main body portion and a first electrode tab and a second electrode tab extending from the main body portion, and the first electrode tab and the second electrode tab being both set in multiple layers;

connecting the multiple layers of the first electrode tab by ultrasonic welding to form a first welding region;

providing an electrode lead, the electrode lead being connected to the electrode assembly and extending to an outside of a packaging bag;

connecting the electrode lead to the multiple layers of the first electrode tab by laser welding to form a second welding region, a laser is applied to a surface of the electrode lead away from the first electrode tab, in the thickness direction of the electrode lead, the surface of the electrode lead that faces the multiple layers of the first electrode tab is welded when forming the second welding region, in a plane perpendicular to a thickness direction of the electrode lead, a projection of the second welding region being located in a projection of the first welding region, and a ratio of an area of the projection of the second welding region to an area of the projection of the first welding region is 0.3-0.7;

the first welding region has a plurality of first recesses, and the plurality of first recesses are disposed at intervals;

in the plane perpendicular to the thickness direction of the electrode lead, a ratio of a sum of areas of projections of the plurality of first recesses to an area of the projection of the first welding region is greater than 50% and less than 100%;

the second welding region has a plurality of second recesses, and the plurality of second recesses are disposed at intervals; and in the plane perpendicular to the thickness direction of the electrode lead, a projection of at least one second recess at least partially overlaps a projection of the first recesses.

10. The manufacturing method for the secondary battery according to claim 9, wherein the step of connecting the multiple layers of the first electrode tab by the ultrasonic welding to form the first welding region is completed before the step of connecting the electrode lead to the multiple layers of the first electrode tab by the laser welding.

11. The secondary battery according to claim 1, wherein the secondary battery further comprises an insulating member, the insulating member surrounds an outer side of the electrode lead and isolates the electrode lead from the packaging bag; and the insulating member comprises an encapsulating portion and an inner extending portion, the encapsulating portion is fused to the packaging bag, and the inner extending portion extends from an end part of the encapsulating portion close to the main body portion toward an inside of the packaging bag.

12. The secondary battery according to claim 11, wherein in a direction parallel to the electrode assembly, a minimum distance between the inner extending portion and the second welding region is greater than 0.5 mm.

13. The apparatus according to claim 6, wherein the secondary battery further comprises an insulating member, the insulating member surrounds an outer side of the electrode lead and isolates the electrode lead from the packaging bag; and the insulating member comprises an encapsulating portion and an inner extending portion, the encapsulating portion is fused to the packaging bag, and the inner extending portion extends from an end part of the encapsulating portion close to the main body portion toward an inside of the packaging bag.

14. The apparatus according to claim 13, wherein in a direction parallel to the electrode assembly, a minimum distance between the inner extending portion and the second welding region is greater than 0.5 mm.

\* \* \* \* \*